United States Patent
Rozacky et al.

[15] 3,702,615
[45] Nov. 14, 1972

[54] NON-TOBACCO SMOKEABLE, CHEWING AND DIPPING PRODUCT

[72] Inventors: Eugene E. Rozacky; Rebecca Rozacky, both of 1304 Wentwood Drive, Irving, Tex. 75060

[22] Filed: July 27, 1970

[21] Appl. No.: 58,624

[52] U.S. Cl. ................................................131/2
[51] Int. Cl. ........................A24b 15/00, A24d 01/18
[58] Field of Search...131/2, 140 B, 142 R, 141, 144, 131/140 R

[56] References Cited

UNITED STATES PATENTS

| | | | |
|---|---|---|---|
| 2,930,720 | 3/1960 | Finberg | 131/17 R |
| 2,080,179 | 5/1937 | Merriam et al. | 131/142 R X |
| 269,832 | 1/1883 | Daniel | 131/140 R |
| 1,268,070 | 5/1918 | Garner et al. | 131/140 R |
| 2,943,958 | 7/1960 | Schaflander | 131/2 |
| 3,034,931 | 5/1962 | Kiefer | 131/2 |
| 3,106,209 | 10/1963 | Torigian | 131/2 |

OTHER PUBLICATIONS

Facts: Smoking & Health, U.S. Dept. Health, Education & Welfare Publication (HSM No. 72-7508, 9/1971) pg. 11 cited.

The Sinister Garden, Wyeth Laboratories; Philadelphia, Pa., (1966), pages 11 and 34 cited.

*Primary Examiner*—Samuel Koren
*Assistant Examiner*—G. M. Yahwak

[57] ABSTRACT

A process for aging and forming derivatives or adducts of the chemical composition of fresh leaves of certain non-toxic plants (excluding tobacco) and vegetables to produce a leaf product having aroma, taste and burning characteristics similar to commercial tobacco products but free of nicotine.

3 Claims, 2 Drawing Figures

AGING PROCESS

INVENTORS
REBECCA ROZACKY
EUGENE E. ROZACKY

NON-TOBACCO SMOKEABLE, CHEWING AND DIPPING PRODUCT

BACKGROUND OF THE INVENTION

Many medical and research studies to date have implicated and emphasized that certain natural substances in tobacco such as nicotine and tar products constituted certain health hazards with the use of tobacco products.

We have invented a new process for the treatment of any dried, shredded vegetable, plant (non-tobacco) or tree leaf material for the production of a commercially acceptable tobaccoless smoking product with an aroma and taste similar to tobacco but without the harmful ingredients therein.

SUMMARY OF THE INVENTION

Our invention is directed toward a method of aging and making derivatives or changes in the chemical composition of fresh leaves of certain non-toxic plants (non-tobacco) and vegetables in such a way to produce a leaf product that has an aroma, taste, and burning characteristic similar to commercial tobacco products without its harmful nicotine. This invention involves the aging of fresh leaves with a moisture content of 15–30 percent in an atmosphere of 88 percent Freon 12 and 12 percent ethylene oxide or 90%$Co_2$/10% ethylene oxide (propylene oxide can be substituted for ethylene oxide) or any other suitable ratio or combination of the above gas mixtures for a period of 1 to 8 months at a temperature of 90° to 110°F. The aged, whole or shredded leaf is further treated with a propylene oxide and/or ethylene oxide solution to make derivatives or change its chemical composition in such a way as to improve its aroma, taste and burning characteristics. The shredded or whole aged and/or treated leaves are further cased or sprayed with commercially available humectants and flavors.

This invention can be applied to many types of non-toxic plant and vegetables leaves such as: lettuce, spinach, cabbage, and other edible vegetable and plant leaves.

DETAILED DESCRIPTION OF PREFERRED EMBODIMENTS

Figure 1:
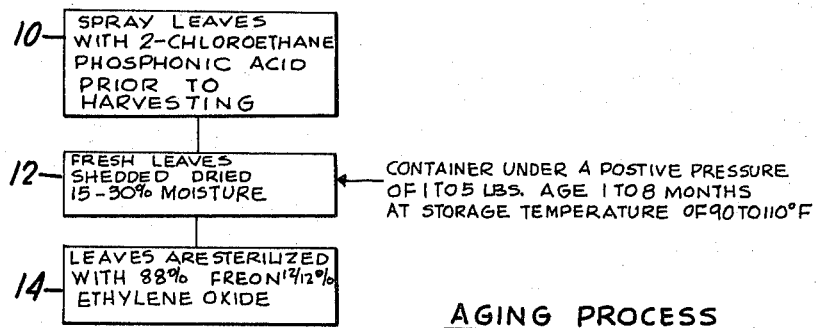
FIG. 1 illustrated the process for aging utilized in our invention.

Referring first to FIG. 1, fresh leaves, shredded or whole, dried to 15–30 percent moisture, as shown at 12, are placed into a gas-tight rust proof container and sealed. (The leaves may or may not have been sprayed with 2-chloroethane phosphonic acid as shown at 10 while on the plant or tree several days prior to harvesting to accelerate senescence). The leaves are sterilized or fumigated as shown at 14 with either an 88 percent Freon 12 and 12 percent ethylene oxide or 90% $CO_2$ and 10% ethylene oxide (propylene oxide can be substituted for ethylene oxide) or other suitable mixtures of these gas mixtures to prevent undesirable mold, fungi and bacterial growth. The container is charged with the gas mixture to a positive pressure of 1–5 lbs. above atmospheric pressure. The leaves are left to age from 1 to 8 months in the gas-tight container at a storage temperature of 90° to 110°F depending on the desired results. In sterilizing leaves used primarily for chewing or snuff-like products, an 88 percent Freon 12 and 12 percent propylene oxide or 90% $CO_2$ and 10% propylene oxide or other suitable mixtures of these gas mixtures can be used.

Figure 2:
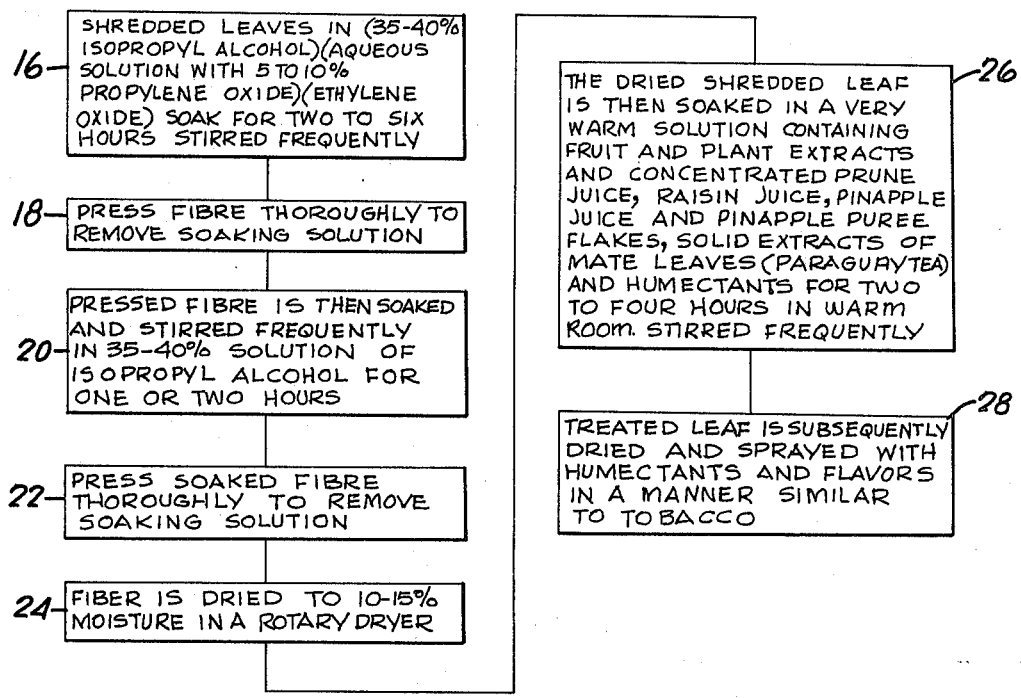
FIG. 2 illustrates the method for processing employed in our invention after aging has been completed.

Referring now to FIG. 2, shredded leaves from the aging process of FIG. 1 are placed into large polyethylene or stainless steel containers. An aqueous solution of 35–40 percent isopropyl alcohol and/or aqueous solution with 5 to 10 percent propylene oxide and/or ethylene oxide added is used to soak the leaves for 2—6 hours as shown at 16. About 5 gallons of this solution is used for 5½ lbs. of shredded leaf material. The soaked fiber is stirred frequently during the soaking period. Then, the fiber is centrifuged or pressed thoroughly to remove the soaking solution as shown at 18. The centrifuged or pressed fiber is then soaked and stirred frequently in a 35–40 percent solution of isopropyl alcohol for 1 to 2 hours as shown at 20. Again, the soaked fiber is thoroughly centrifuged or pressed to remove the soaking solution as shown at 22. The purpose of this soak and centrifugation is to remove all excess, residual and unreacted propylene oxide and/or ethylene oxide from the fiber. The fiber is then dried to 10–15 percent moisture in a rotary dryer as shown at 24. All traces of unreacted propylene oxide, ethylene oxide and Freon 12 will be removed in this step. The dried, shredded leaf material is then soaked in a very warm solution containing commercially available fruit and plant extracts and concentrates such as concentrated prune juice, concentrated raisin juice, concentrated pineapple juice and/or pineapple puree flakes, solid extracts of Mate leaves (Paraguay tea) and commercial humectants for 2 to 4 hours in a warm room as shown at 26. These ingredients may be used singly or in various combinations with each other. The mixture is stirred frequently during the soak. Then the treated material is subsequently dried and sprayed with additional commercially available humectants and flavors in a manner similar to tobacco as shown at 28.

For the production of a chewing plug or snuff-like products, the dried leaves are sprayed and sweetened with commercial flavors or sweeteners prior to the start of the aging process. The aged, material may be dried prior to incorporation of other flavoring agents. After aging, the leaf material is not subjected to processed 16 through 26 of FIG. 2. It is to be understood that any suitable flavoring material can be incorporated into the leaves or other material as they are being treated or after the termination of such treatment.

While we have described our invention with particular reference to the drawings, such is not to be considered as limiting its actual scope.

Having thus described this invention, what is asserted as new is:

1. The process of forming a tobacco substitute material having aroma, taste, and burning characteristics similar to tobacco but free of nicotine, from fresh leaves of lettuce, spinach, or cabbage comprising the steps of:

drying said leaves to a moisture content of 15—30 percent;

aging said dry leaves in a atmosphere consisting of Freon 12, ethylene oxide, propylene oxide, carbon dioxide, or mixtures thereof, under a positive pressure of 1 to 5 pounds and at a temperature of 90°–110°F for a period of 1 to 8 months;

soaking said aged leaves in an aqueous solution comprising 35–40 percent isopropyl alcohol for a period of 2–6 hours;

drying said soaked leaves to a moisture content of 10–15 percent;

soaking said dry leaves in a very warm flavoring solution of plant extracts comprising prune juice; raisin juice; pineapple juice, or Paraguay tea;

drying said flavored leaves to a suitable moisture content for use as a tobacco substitute.

2. The process of claim 1 wherein the leaves are shredded after said aging step.

3. The process of claim 1 wherein tobacco humectants are added to the flavoring solution.

* * * * *